Figure 1:
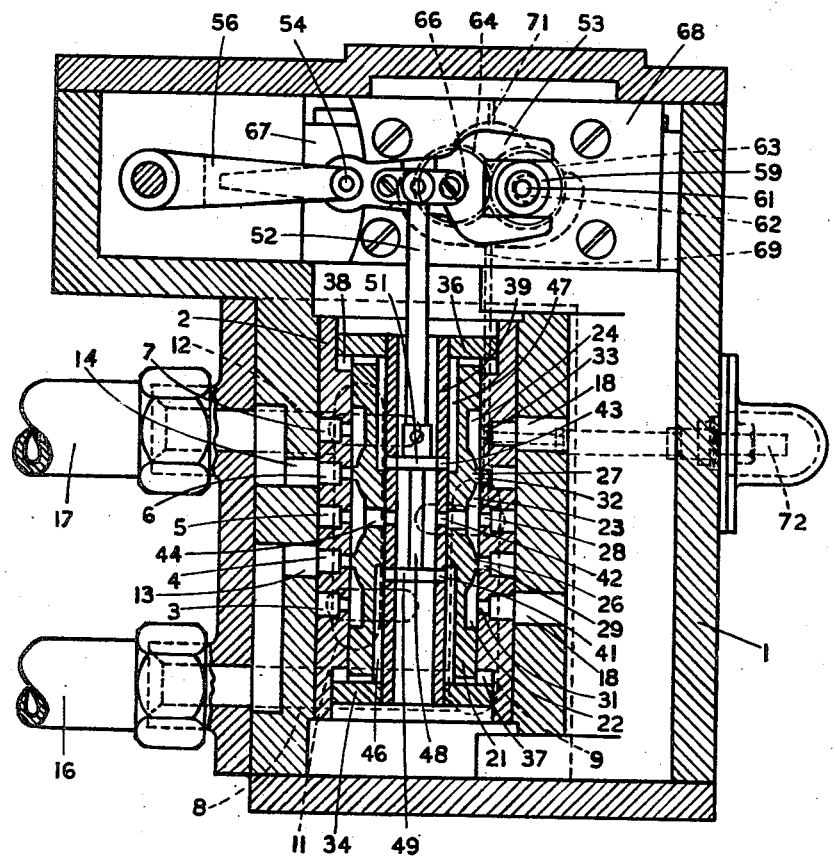

Nov. 30, 1948.  A. G. ROSE ET AL  2,455,315
PILOT OPERATED HYDRAULIC VALVE AND
DITHER MECHANISM THEREFOR
Filed June 8, 1945

Inventors
A.G. Rose
and K.H. Nicholls
By
Munn, Liddy & Glaccum
Attorneys

Patented Nov. 30, 1948

2,455,315

UNITED STATES PATENT OFFICE 2,455,315

PILOT OPERATED HYDRAULIC VALVE AND DITHER MECHANISM THEREFOR

Alfred German Rose, Gainsborough, and Kenneth Howard Nicholls, Freshford, England Application June 8, 1945, Serial No. 598,382
In Great Britain May 18, 1944

Section 1, Public Law 690, August 8, 1946
Patent expires May 18, 1964

7 Claims. (Cl. 121—46.5)

This invention relates to hydraulic valve mechanism and has for an object to provide such a mechanism capable of controlling a hydraulic apparatus in a very sensitive manner.

According to the invention, there is provided a hydraulic valve mechanism comprising a valve body provided with pressure and exhaust ports, a servo valve slidably mounted in said body and adapted to control the flow of hydraulic medium through the pressure and exhaust ports, a controlling valve slidably mounted within the servo valve and adapted upon sliding movement to connect it to the pressure and exhaust ports, and means for oscillating the controlling valve in such a manner as to connect and disconnect alternately the servo valve with the pressure and exhaust ports in rapid succession. It will be understood that the rate of oscillation of the controlling valve may vary between fairly wide limits according to the type of apparatus in which the valve mechanism is used and the conditions under which it is intended to be used. For example, the rate may vary from 1,000 or less oscillations per minute to 1,500, 2,000 or more oscillations per minute.

The oscillation of the controlling valve may be brought about by means of an oil motor which may be conveniently fed from the pressure port in the valve body. The oil motor may be conveniently in the form of a pair of intermeshing gears the shaft of one of which is formed with an eccentric arranged to engage a forked pivoted arm which is connected to the controlling valve by a pivoted link.

According to a feature of the invention, the valve body, servo valve, controlling valve and oil motor are arranged in a common valve chest, thus constituting a valve unit which may be applied, with suitable modifications, to a large variety of hydraulically driven apparatus.

Such a valve unit will now be described, by way of example, with reference to the accompanying drawings, as applied to the hydraulic apparatus employed in the gun turret described in United States patent application No. 516,651, filed January 1, 1944, reference being made to that application for details of the construction and operation of the turret not apparent from this description.

Figure 2:
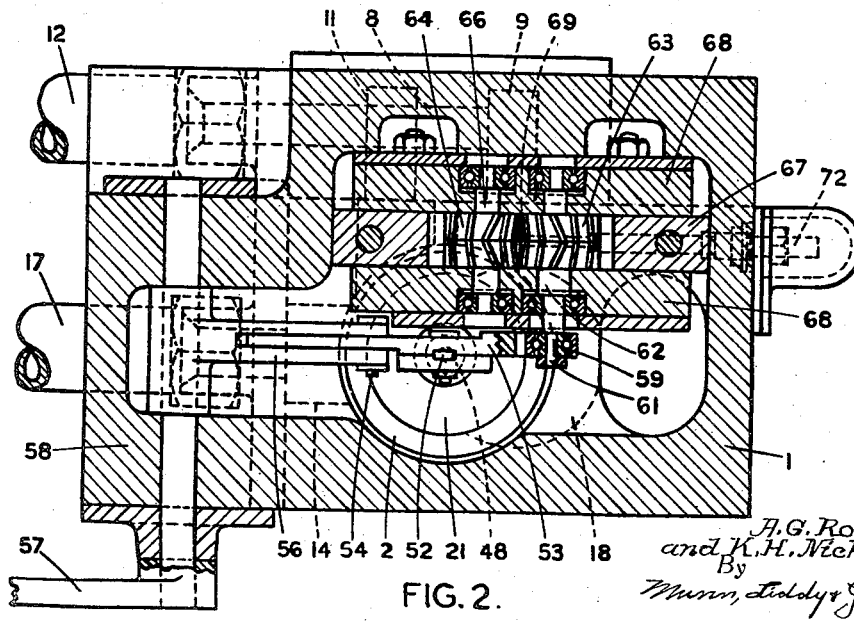

In the drawings:

Figure 1 is a sectional elevation through a valve unit constructed according to the invention, and Figure 2 is a plan view, partly in section, of the valve unit shown in Figure 1.

The gun turret described in the above-mentioned application employs two valve units one controlling the training motion of the guns and the other the elevation motion. Since both units are substantially identical in construction, the following description will be restricted to the construction of the valve unit intended for controlling the elevation oil motors.

The valve unit is housed in a valve chest 1 attached to the recoil frame carrying the guns of the turret for movement with the guns as described in the application mentioned above. The valve chest 1 is bored for the reception of a cylindrical valve body 2 which forms a tight press fit in the bore. The valve body is formed with a series of five annular oil grooves 3, 4, 5, 6, and 7, the central groove 5 being the main pressure groove fed by a main pressure line 8 through a main pressure port 9 formed in the valve chest, while the two outer grooves 3 and 7 are exhaust grooves connected by a common exhaust port 11 formed in the valve chest and leading to a main exhaust line 12. The remaining oil grooves 4 and 6 are connected by ports 13 and 14 to oil lines 16 and 17 leading to the elevation oil motors of the turret. The grooves 4 and 6 each act either as pressure or exhaust grooves according to the direction of rotation required in the elevation oil motors, as described below. Further ports 18 in the valve chest connect the exhaust grooves 3 and 7 with the space inside the valve chest, which, under normal running conditions, is full of circulating oil.

Slidably mounted in a central bore of the valve body 2 is a servo valve 21 having three annular oil grooves 22, 23 and 24 separated by lands 26 and 27. The central groove 23 is a pressure groove fed from the pressure groove 5 through a series of radial ports 28, while the grooves 22 and 24 serve to connect the grooves 4 and 6 with the exhaust grooves 3 and 7, respectively, through further radial ports 29, 31 and 32, 33, respectively, according as the servo valve is moved in one direction or the other. The lands 26 and 27 are spaced apart by an amount equal to the spacing of the ports 29 and 32 and have a width very slightly greater than the diameter of the ports 29 and 32 so that the ports 29 and 32 are just covered by the lands 26 and 27 when the servo valve is in a central position. The ends of the servo valve 21 are provided with cylindrical flanges 34 and 36 the outer peripheries of which are arranged to slide in recesses in the valve body so as to form annular spaces 37 and 38, respectively, for a purpose to be described later.

The servo valve 21 is also provided with a central sleeve 39 formed with three series of radial ports 41, 42 and 43, the central ports 42 connecting with the central groove 23 through radial ports 44 while the ports 41 and 43 communicate with the annular spaces 37 and 38, through oilways 46 and 47, respectively. Slidably mounted in the bore of the sleeve 39 is a controlling valve 48 provided with a pair of cylindrical flanges 49 and 51, arranged to just cover the radial ports 41 and 43 when the valve is in its central position.

The valve 48 is attached by means of a pivoted link 52 to a forked arm 53 itself pivoted at 54 to one arm 56 of a controlling arm 56, 57 pivotally mounted in bearings 58 in the valve chest, the arm 57 being connected to the sighting arm of the gun turret. The fork 53 is arranged to embrace a ball bearing 59 mounted on an eccentric 61 extending from a shaft 62 on which is mounted one of a pair of gears 63 and 64, the gear 64 being mounted on a further shaft 66 similar to the shaft 62. The gears 63 and 64 constitute an oil motor (referred to hereinafter as a "dither motor") and are housed in a body member 67 and end walls 68 provided with bearings for the shafts 62 and 66. The dither motor is fed from the pressure groove 5 through a port 69 and exhausts into the interior of the valve chest 1 through an exhaust port 71. A screw adjusting member 72 is provided for varying the flow of oil to the motor, and thus controlling its speed.

The throw of the eccentric 61 may be varied according to the use to which the valve mechanism is to be put. In this example, however, it is found that a throw of .020 of an inch is suitable. The speed of the dither motor is also variable according to the needs of the apparatus in which the valve unit is employed. In the case of this example, however, a suitable speed is found to be about 1,000 revolutions per minute.

In operation, the arm 57 of the controlling arm 56, 57 is moved by the sighting arm of the gun turret in accordance with the requirements of aim whereupon the controlling valve 48 is moved by the link 52. Such movement of the valve 48 (say downwardly as viewed in Figure 1) opens the ports 41 to the pressure groove 23 and the ports 43 to the interior of the valve chest through the hollow sleeve 39 and thus to exhaust. As soon as the ports 41 open, oil under pressure flows through the oilways 46 to the annular space 37 and exerts pressure on the flange 34 thus causing the servo valve to slide downwardly and in so doing opening the ports 29 to the pressure groove 23 and the ports 32 to the exhaust groove 24. Oil under pressure can now flow from the pressure groove 23 into the groove 4 (which thus becomes for the time being a pressure groove) and thus to the elevation oil motors of the gun turret, exhaust oil from the elevation motors flowing back to the exhaust groove 24 through the groove 6 (which is thus acting for the time being as an exhaust groove). It will be understood that when the controlling valve 48 is moved in the opposite direction, similar considerations apply with the servo valve 27 sliding in the opposite direction and the oil grooves 4 and 6 becoming exhaust and pressure grooves respectively.

As described above, the valve chest 1 is attached to the recoil frame carrying the guns and thus moves bodily with the guns so that for continuous movement of the guns the sighting arm of the gun turret must also move continuously so that there is no relative movement between the controlling valve 48 and the sleeve 39. It will thus be seen that as the sighting arm of the gun turret is brought to rest so the continued motion of the valve unit bodily in relation to the controlling valve 48 causes the ports 41 and 43 first to close and then to open to exhaust and pressure, respectively, with the result that the servo valve 21 is caused to move in the opposite direction and close the ports 29 and 32 whereupon the supply of oil is cut off from the elevating motors.

The construction of the valve mechanism is such that the slightest opening of the ports 41 or 43 by the valve 48 brings about a substantially immediate response in the servo valve 21 which, in turn, causes a substantially immediate response in the guns.

The sensitive action of the valve mechanism is considerably enhanced by the oscillation of the controlling valve 48 by means of the dither motor, such action opening the various ports to pressure and exhaust in rapid succession and thus keeping the entire oil in the system in a state of pulsation and the various moving parts "live." Such continuous motion of the oil and the movable parts of the apparatus is particularly useful when the valve unit is used, as in this example, in an aircraft gun turret, since the possibility of the oil freezing up at high altitudes is considerably reduced.

We claim:

1. A hydraulic valve mechanism for controlling a hydraulic apparatus, comprising a valve body formed with main pressure and exhaust ports and pressure and exhaust connecting ports arranged to conduct hydraulic medium to and from the hydraulic apparatus, a servo valve slidably mounted within said body and formed with pressure and exhaust conduits and valve closure members so arranged that the servo valve may be slid from a neutral position where said closure members are in register with said connecting ports to such positions that said pressure conduit connects said main pressure ports to either of said pressure or exhaust connecting ports, a controlling valve slidably mounted within said servo valve and forming therewith a pressure chamber in constant connection with said pressure conduit, closure members formed on said controlling valve and so arranged that said controlling valve may be slid from a neutral position where said closure members are in register with valve-actuating ports formed in said servo valve to such positions that said valve-actuating ports connect said pressure chamber to one or the other of a pair of closed chambers formed within said servo valve and said valve body, a valve controlling arm pivotally mounted in said valve body, a valve-oscillating arm pivotally mounted on said valve-controlling arm and pivotally connected to said controlling valve, and means for rapidly oscillating said valve-oscillating arm so as to cause said controlling valve to connect said pressure chamber to said closed chambers in rapid alternation.

2. Apparatus according to claim 1, wherein the valve body, servo valve, controlling valve, and associated mechanism, and the oscillating means are arranged in a common valve chest, thus constituting a valve unit.

3. A hydraulic valve mechanism for controlling a hydraulic apparatus, comprising a valve body formed with main pressure and exhaust ports and pressure and exhaust connecting ports arranged to conduct hydraulic medium to and from the hydraulic apparatus, a servo valve slidably mounted within said body and formed with pressure and exhaust conduits and valve closure members so arranged that the servo valve may be slid from a neutral position where said closure members are in register with said connecting ports to such positions that said pressure conduit connects said main pressure ports to either of said pressure or exhaust connecting ports, a controlling valve slidably mounted within said servo valve and forming therewith a pressure chamber in constant connection with said pressure conduit, closure member formed on said controlling valve and so arranged that said controlling valve may be slid from a neutral position where said closure members are in register with valve-actuating ports formed in said servo valve to such positions that said valve-actuating ports connect said pressure chamber to one or the other of a pair of closed chambers formed within said servo valve and said valve body, a valve-controlling arm pivotally mounted in said body, a valve-oscillating arm pivotally mounted on said valve-controlling arm and pivotally connected to said controlling valve, and means for rapidly oscillating said valve-oscillating arm so as to cause said controlling valve to connect said pressure chamber to said closed chambers in rapid alternation, said oscillating means comprising an oil motor.

4. Apparatus according to claim 3 wherein the oil motor is fed from the main pressure port in the valve body.

5. Apparatus according to claim 3, wherein the oil motor is in the form of a pair of intermeshing gears.

6. Apparatus according to claim 3, wherein the valve body, servo valve, controlling valve and associated mechanism, and the oil motor are arranged in a common valve chest, thus constituting a valve unit.

7. A hydraulic valve mechanism for controlling a hydraulic apparatus, comprising a valve body formed with main pressure and exhaust ports and pressure and exhaust connecting ports arranged to conduct hydraulic medium to and from the hydraulic apparatus, a servo valve slidably mounted within said body and formed with pressure and exhaust conduits and valve closure members so arranged that the servo valve may be slid from a neutral position where said closure members are in register with said connecting port to such positions that said pressure conduit connects said main pressure ports to either of said pressure or exhaust connecting ports, a controlling valve slidably mounted within said servo valve and forming therewith a pressure chamber in constant connection with said pressure conduit, closure members formed on said controlling valve and so arranged that said controlling valve may be slid from a neutral position where said closure members are in register with valve actuating ports formed in said servo valve to such positions that said valve-actuating ports connect said pressure chamber to one or the other of a pair of closed chambers formed between said servo valve and said valve body, a valve-controlling arm pivotally mounted in said valve body, a valve-oscillating arm pivotally mounted on said valve-controlling arm and pivotally connected to said controlling valve, a forked member on said valve-oscillating arm, an oil motor comprising a pair of intermeshing gears, an eccentric formed on the shaft of one of the gears and arranged to engage the formed member on the valve-oscillating arm so as to bring about oscillation of said valve-oscillating arm thus causing said controlling valve to connect said pressure chamber to said closed chambers in rapid alternation.

ALFRED GERMAN ROSE.
KENNETH HOWARD NICHOLLS.

REFERENCES CITED

The following references are of record in the file of this patent:

UNITED STATES PATENTS

| Number | Name | Date |
|---|---|---|
| 1,125,825 | Englesson | Jan. 19, 1915 |
| 1,151,522 | Hodgkinson | Aug. 24, 1915 |
| 1,411,348 | Haeberlein | Apr. 4, 1922 |
| 1,511,425 | Roučka | Oct. 14, 1924 |
| 2,347,368 | Rosen | Apr. 25, 1944 |
| 2,368,628 | Bates | Feb. 6, 1945 |